under 35 U.S.C. 154(b) by 1402 days.

(12) United States Patent
Marra, III et al.

(10) Patent No.: US 7,103,425 B1
(45) Date of Patent: Sep. 5, 2006

(54) METHOD OF REGULATING A TARGET SYSTEM USING A FREQUENCY COMPARISON OF FEEDBACK AND REFERENCE PULSE TRAINS

(75) Inventors: Michael Anthony Marra, III, Lexington, KY (US); Bruce Lanier Walcott, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1402 days.

(21) Appl. No.: 09/226,971

(22) Filed: Jan. 8, 1999

(51) Int. Cl.
*G05B 11/01* (2006.01)

(52) U.S. Cl. .................. 700/78; 700/40; 700/42; 318/610

(58) Field of Classification Search .......... 700/9, 700/40–43, 78; 702/72; 327/7, 155–157; 331/17, 25; 318/434, 603, 608–610; 123/406.19
See application file for complete search history.

(56) References Cited

U.S. PATENT DOCUMENTS 4,494,509 A * 1/1985 Long ................ 123/406.19
5,212,434 A * 5/1993 Hsieh ...................... 318/603
6,043,695 A * 3/2000 O'Sullivan ................ 327/157

OTHER PUBLICATIONS

Jung-Chien Li and Guan-Chyun Hsieh "A Phase/Frequency-Locked Controller for Stepping Servo Control Systems" IEEE Transactions on Industrial Electronics, vol. 39,No. 2, Apr. 1992, pp. 112-119.*
Motorola MC4344/MC4044 Phase Frequency Detector brochure, pp. 6-20-6-37.*

* cited by examiner

*Primary Examiner*—Leo Picard
*Assistant Examiner*—Steven R. Garland
(74) *Attorney, Agent, or Firm*—Taylor & Aust, P.C.

(57) ABSTRACT

A method of regulating a target system generates a plurality of digital signals which define a reference pulse train with a frequency dependent upon a reference signal. A target system to be regulated (such as a transport speed of a paper transport assembly in a printer) has an output in the form of a plurality of digital signals defining a feedback pulse train having a frequency. The frequency of the reference pulse train is compared with the frequency of the feedback pulse train. A control signal is generated dependent upon the frequency comparison, and is provided as an input to the target system.

7 Claims, 3 Drawing Sheets

METHOD OF REGULATING A TARGET SYSTEM USING A FREQUENCY COMPARISON OF FEEDBACK AND REFERENCE PULSE TRAINS

BACKGROUND OF THE INVENTION

1. Field of the Invention

The present invention relates to automatic control systems with feedback, and, more particularly, to proportional/integral/derivative automatic control systems using a feedback pulse train from a target system to be regulated.

2. Description of the Related Art

Automatic control systems with feedback are used to regulate the operation of a target system, such as a paper transport assembly in a printer with a regulated rotational speed of a roll. One such control system is known as a proportional/integral/derivative (PID) control system which provides a control signal to the target system which depends upon an error signal (proportional, KP) the integral of the error signal over time (integral, KI), and the change in the error signal over time (derivative, KD). A weighting or gain constant is associated with each of three error terms KP, KI and KD. A transfer function utilizes these three error terms to generate a control signal used to control the target system. Examples of such transfer functions include:

Continuous Transfer Function:

$$GPID(S)=KP+KI/S+KdS$$

Discrete Transfer Function:

$$GPID(Z)=KP+KI[Tz/(z-1)]+KD[(z-1)/Tz]$$

where:
T—sampling period
KP—proportional gain
KI—integral gain

A conventional PID control system as described above may be carried out using a computer, such as a personal computer (PC). A problem with such a conventional PID control system is that the target system typically provides digital feedback output signals in a form which cannot be directly utilized by the PC. For example, if the target to be controlled is the rotational speed of a rotating body, such as a roll in a printer, the digital feedback output signals are typically provided in the form of digital pulses which are outputted from an optical encoder. The digital pulses cannot directly be used by the PC, but rather must be converted to some form of other digital signal which can be readily interpreted and utilized by the PC. The process of converting the digital feedback pulse train to some other form of digital signal induces errors and noise into the signal which is used as feedback to the control system. Such errors and noise are not desirable.

What is needed in the art is a PID control system which allows the feedback signals from a target system to be more quickly and accurately used by the PIED control system without inducing noise into the system.

SUMMARY OF THE INVENTION

The present invention provides a control system for regulating a target system providing an output in the form of a pulse train, wherein the frequency of the feedback pulse train from the target system is compared directly with the frequency of a reference pulse train without converting the feedback pulse train to some other form of signal.

The invention comprises, in one form thereof, a method of regulating a target system. A plurality of digital signals are generated which define a reference pulse train with a frequency dependent upon a reference signal. A target system to be regulated (such as a transport speed of a paper transport assembly in a printer) has an output in the form of a plurality of digital signals defining a feedback pulse train having a frequency. The frequency of the reference pulse train is compared with the frequency of the feedback pulse train. A control signal is generated dependent upon the frequency comparison, and is provided as an input to the target system.

An advantage of the present invention is that the PID control system may be implemented through the use of hardwired circuitry, rather than requiring the use of a relatively complicated and expensive microprocessor-based circuit.

Another advantage of the present invention is that the feedback pulse train outputted from the target system is compared directly with a reference pulse train, thereby reducing noise which would otherwise be introduced into the control system through conversion of the feedback pulse train to some other form of signal.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
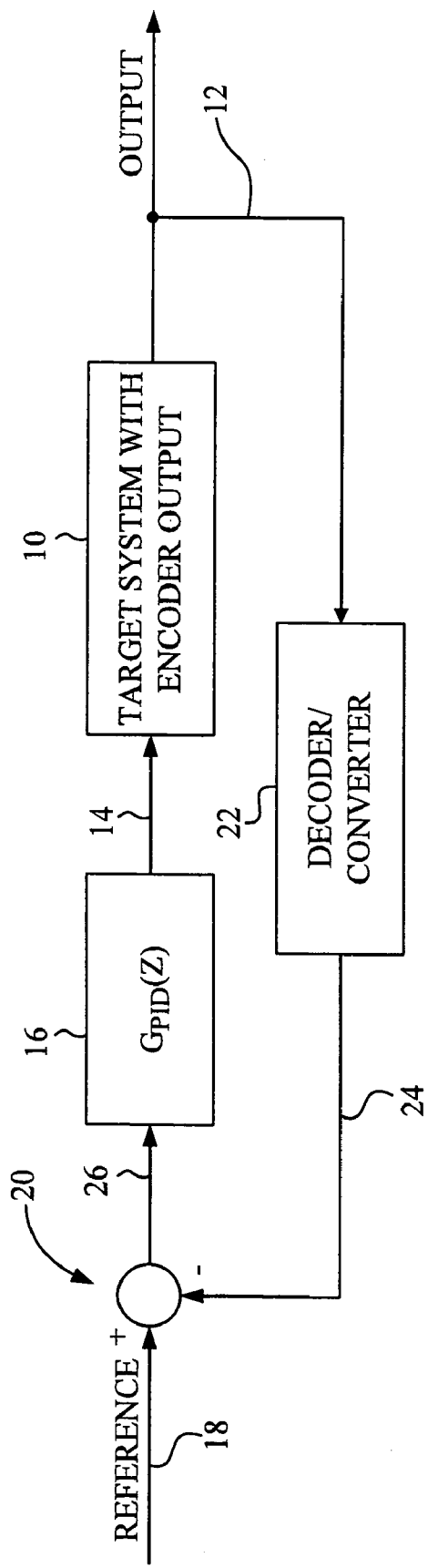
FIG. 1 is a schematic illustration of a convention PID control system using a feedback pulse train.

Referring now to the drawings, and more particularly to FIG. 1, there is shown a schematic illustration of a conventional PID control system using a feedback pulse train. A target system 10 to be regulated provides an encoder output, such as with an optical encoder, over line 12. Target system 10 receives a control signal which is used to control physical components within target system 10 (e.g., the rotational speed of a motor). The control signal is provided to target system 10 over line 14 from, e.g., a computer system which is capable of modifying the control signal according to a transfer function represented by block 16. The transfer function GPID includes proportional, integral and derivative components in known manner. The exact transfer function GPID which is used may vary from one system to another, and is easily determined using known principals and equations for automatic control systems. Typically, transfer function GPID includes three error terms KP, KI and KD which are calculated for a given target system to be regulated and used within the same transfer function. To that end, a reference signal is provided over line 18 to a summing node 20. Additionally, a feedback signal which is compatible with the reference signal is received at summing node 20 from decoder/converter 22 over line 24. Decoder/converter 22 receives feedback signals from target system 10 over line 12 in the form of a digital pulse train, and converts the digital pulse train to digital values which may be used by the computer which carries out the summing operation at summing node 20 and the transfer function at block 16. An error signal, representing the difference between the reference signal provided over line 18 and the feedback signal provided over line 24, is used as an input at line 26 to the transfer function GPID in block 16.

A problem with a conventional PID control system as shown in FIG. 1 is that noise is introduced into the control system. More particularly, target system 10 provides a plurality of output signals in the form of digital pulses defining a feedback pulse train which is received by decoder/converter 22 over line 12. Decoder/converter 22 decodes the feedback pulse train and converts the feedback pulse train to a form which is usable by the computer used to carry out transfer function GPID. This conversion of the feedback signal results in slight alterations of the feedback pulse train and also induces noise into the control system. Such noise is not desirable.

Moreover, the additional decoding/converting process which occurs within decoder/converter 22 also requires additional circuitry and time to carry out the decoding/converting of the feedback pulse train to a form which is usable by the computer.

Figure 2:
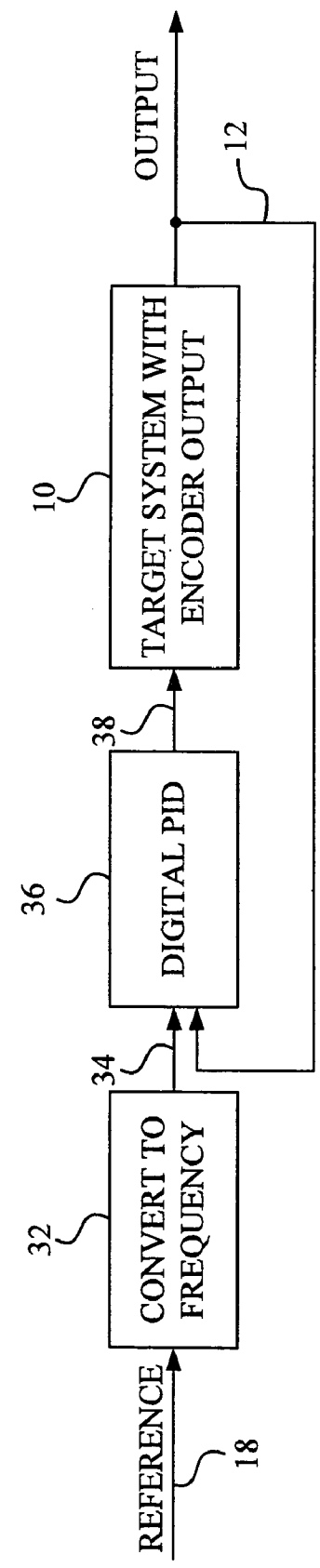
FIG. 2 is a schematic illustration of an embodiment of a PID control system using a feedback pulse train which may be used to carry out the method of the present invention.

Referring now to FIG. 2, there is shown a schematic illustration of an embodiment of a PID control system using a feedback pulse train which may be used to carry out the method of the present invention. Target system 10, for the sake of illustration, is considered to be substantially identical to target system 10 shown in FIG. 1. Thus, target system 10 provides an output over line 12 in the form of a plurality of digital pulses which define a feedback pulse train having a frequency. An example of such a pulse train is shown and labeled "encoder output" in FIG. 3. A digital PID control system 30 shown in FIG. 2 principally varies from the PID control system shown in FIG. 1 in that the feedback pulse train transmitted over line 12 is used directly in its outputted form to generate a control signal which is used to control target system 10. More particularly, a reference signal, such as a digital value, is provided over line 18, similar to the reference signal provided over line 18 in FIG. 1. The digital reference signal is received by a converter 32 which converts the digital value of the signal to a plurality of digital pulses defining a reference pulse train having a frequency. The reference pulse train is provided as an output over line 34 to digital PID 36. The frequency of the reference pulse train received by digital PID 36 is compared with the frequency of the feedback pulse train received over line 12, rather than comparing digital values as is the case with summing node 20 shown in FIG. 1. The comparison of the reference pulse train and the feedback pulse train results in the generation of a proportional error pulse train which represents an error between the reference pulse train and the feedback pulse train. The proportional error pulse train is used to generate a proportional error term, integral error term, and derivatative error term, which in turn are used to generate a control signal which is outputted over line 38 to target system 10 to thereby control the operation of target system 10.

Figure 3:
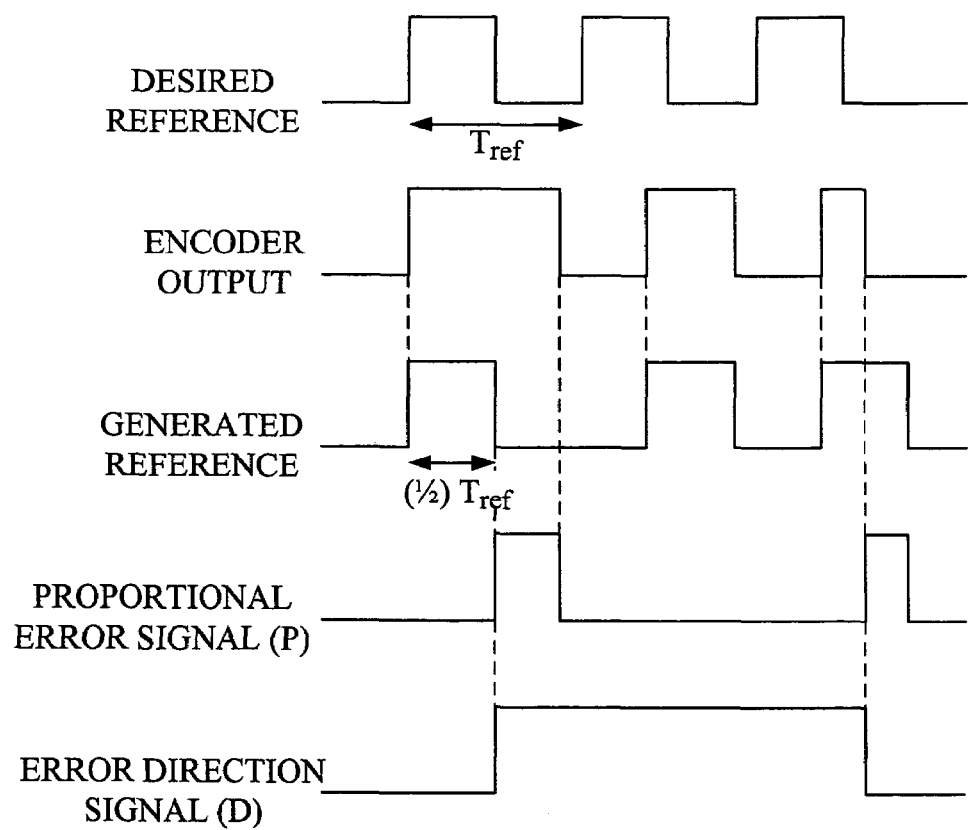
FIG. 3 is a graphical illustration of the signal pulse trains which are generated and used by the PID control system of FIG. 2.

Referring now to FIG. 3, the method of regulating target system 10 shown in FIG. 2 will be described in further detail. A digital signal transmitted over line 18 in FIG. 2 corresponds to a desired reference pulse train (labeled "desired reference") with an associated constant frequency. The period of the desired reference pulse train is labeled $T_{ref}$ in FIG. 3. The desired reference pulse train is outputted from converter 32 to digital PID 36.

The feedback pulse train labeled "encoder output" is also received by digital PID 36 from target system 10. The feedback pulse train may have a constant or a varying frequency, dependent upon the operating state of target system 10. Digital PID 36 generates a reference pulse train (labeled "generated reference") having pulse widths which correspond to the width of the pulse train labeled "desired reference" which is outputted from converter 32. Digital PID 36 aligns the leading edge of each pulse in the "generated reference" pulse train with the leading edge of each pulse in the feedback pulse train. The difference between each pair of aligned pulses is used to generate a proportional error pulse train having a plurality of digital signals in the form of digital pulses. The width of each digital pulse in the proportional error pulse train corresponds to the difference between an aligned pair of pulses between the feedback pulse train and the generated reference pulse train. Based upon the comparison, the pulse of either the feedback pulse train or the generated reference pulse train having a greater width is used to generate an error direction pulse train (labeled "error direction signal") including a plurality of digital signals. If the pulse width of the feedback pulse train is wider than the pulse width of the generated reference pulse train, the error direction signal transitions from a low state to a high state at the beginning of a pulse in the proportional error pulse train. On the other hand, if the pulse width of a pulse in the generated reference pulse train is wider than the pulse width of a corresponding pulse in the feedback pulse train, the error direction pulse train transitions from a high state to a low state at the leading edge of a corresponding pulse within the proportional error pulse train. Thus, the magnitude of an error is indicated by the proportional error pulse train, and the directionality of the error is indicated by the error direction pulse train.

Digital PID 36 need not be in the form of a computer, but rather may be in the form of hard wired circuitry used to make the frequency-to-frequency comparison described above between the feedback pulse train and desired reference pulse train. Digital PID 36 also includes timer circuitry which is used to carry out timing between transitions from a high state to a low state, and vice versa, of the proportional error pulse train and error direction pulse train described above. The timing circuitry allows the various timings to be carried out at a frequency which may be varied. To generate the error terms KP, KI and KD, the timing circuitry is operated as follows:

Proportional Clock 1 (CP1):
    If proportional error signal is in high state (P=1), CP1 counts UP at frequency fP1.
    If proportional error signal is in low state (P=0), CP1 is reset to zero.

Proportional Clock 2 (C2):
    As proportional error signal transitions from high to low, CP2 is loaded with the current state of CP1.

CP2 then counts down at frequency fP2 until a zero state is reached.

In order to vary the weighting on the proportional terms, the frequencies of the counters are varied such that:

$$KP = \frac{fP1}{fP2}$$

The actual weighted proportional error term is the time average of a signal that is held high while CP2 is non-zero, and held low while the state of CP2 is zero.

Integral Clock 1 (CI1):

If proportional signal is in high state (P=1) and directional signal is in high state (D=1), CI1 counts UP at frequency fI1.

If proportional signal is in high state (P=1) and directional signal is in low state (D=0), CI1 counts DOWN at frequency fI1.

If proportional signal is in low state (P=0), CI1 holds its current value.

Integral Clock 2 (CI2):

As proportional signal transitions from high to low, CI2 is loaded with the current state of CI1.

CI2 then counts down at a frequency fI2 until a zero state is reached.

In order to vary the weighting on the integral terms, the frequencies of the counters are varied such that:

$$KI = \frac{fI1}{fI2}$$

The actual weighted integral error term is the time average of a signal that is held high while CI2 is non-zero, and held low while the state of CI2 is zero.

Derivative Clock 1 (CD1):

If proportional signal is in high state (P=1), CD1 counts UP at frequency fD1.

As proportional signal transitions from high to low, the state of CD1 is subtracted from the current state of a register (R). This value (CD1−R) is then loaded into CD2.

The state of CD1 is then loaded and stored into register R, and CD1 is reset to a zero state.

Derivative Clock 2 (CD2):

Once loaded with a non-zero state, CD2 counts DOWN at frequency fD2 until a zero state is reached.

In order to vary the weighting on the proportional terms, the frequencies of the tow counters are varied such that:

$$KD = \frac{fD1}{fD2}$$

The actual weighted derivative error term is the time average of a signal that is held high while CD2 is non-zero, and held low while the state of CD2 is zero.

Figure 4:
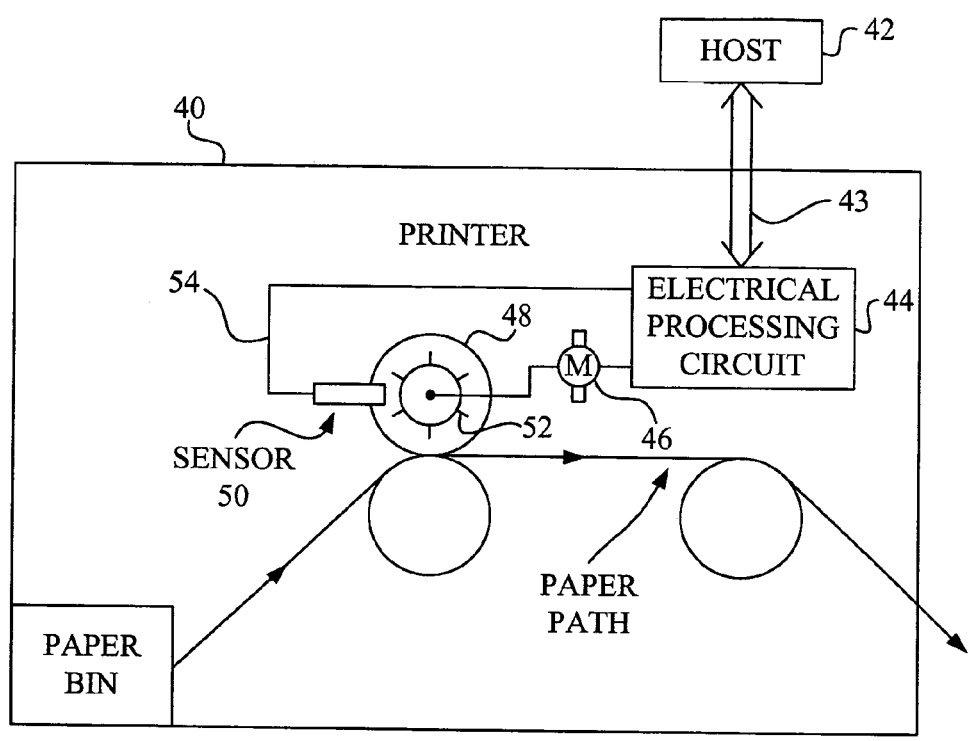
FIG. 4 is a schematic illustration of an embodiment of a printer which may be used to carry out the method of the present invention.

FIG. 4 is a schematic illustration of an embodiment of a printer 40 which may be used to carry out the method of the present invention as described above. Printer 40 is connected with a host 42 via a suitable electrical connection 43, such as a data bus, etc. Printer 40 includes an electrical processing circuit 44 which is used to control various portions of the operation of printer 40. For example, electrical processing circuit 44 is connected with a motor 46 which rotatably drives a roll 48. A sensor 50, such as an optical encoder, senses the passing of a plurality of markers 52 on roll 48, and provides a plurality of output signals in the form of a feedback pulse train which is transmitted via line 54 to electrical processing circuit 44. Thus, motor 46, roll 48 and sensor 50 may correspond to target system 10 shown in FIG. 2.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of regulating a target system, comprising the steps of:
   providing a reference signal;
   generating a plurality of digital signals defining a reference pulse train with a frequency dependent upon said reference signal;
   providing a target system to be regulated, said target system having an output in the form of a plurality of digital signals defining a feedback pulse train having a frequency;
   comparing said frequency of said reference pulse train with said frequency of said feedback pulse train and substantially aligning a leading edge of each digital signal in said reference pulse train with a leading edge of each digital signal in said feedback pulse train;
   generating a control signal dependent upon said comparison without regard to phase locking said feedback pulse train to said reference signal; and
   providing said control signal as an input to said target system.

2. The method of regulating a target system of claim 1, wherein said step of generating said control signal comprises the substep of generating a proportional error pulse train including a plurality of digital signals, each said digital signal representing an error between a corresponding pair of aligned digital signals of said reference pulse train and said feedback pulse train.

3. The method of regulating a target system of claim 2, wherein said step of generating said control signal comprises the further substep of generating an error direction pulse train including a plurality of digital signals, each said digital signal representing a directionality of said error between said corresponding pair of aligned digital signals.

4. A method of regulating a target system, comprising the steps of:
   providing a reference signal;
   generating a plurality of digital signals defining a reference pulse train with a frequency dependent upon said reference signal;
   providing a target system to be regulated, said target system having an output in the form of a plurality of digital signals defining a feedback pulse train having a frequency;
   comparing said frequency of said reference pulse train with said frequency of said feedback pulse train;

substantially aligning a leading edge of each digital signal in said reference pulse train with a leading edge of each digital signal in said feedback pulse train;

generating a control signal dependent upon said comparison without regard to phase locking said feedback pulse train to said reference signal, said generating step including the substeps of:

generating a proportional error pulse train including a plurality of digital signals, each said digital signal representing an error between a corresponding pair of aligned digital signals of said reference pulse train and said feedback pulse train;

counting up from zero with a first proportional clock CP1 at a frequency fP1 when said digital signals of said proportional error pulse train are in a high state;

resetting said first proportional clock CP1 to zero when said digital signals of said proportional error pulse train are in a low state;

loading a current value of said first proportional clock CP1 into a second proportional clock CP2 each time said first proportional clock CP1 transitions from a high state to a low state;

counting down from said loaded current value with said second proportional clock CP2 at a frequency fP2 until a zero value is reached; and determining a proportional error term representing a time average of a signal which is held high while said second proportional clock CP2 is in a high state and held low while said second proportional clock CP2 is in a zero state, said control signal being dependent upon said proportional error term; and providing said control signal as an input to said target system.

5. A method of regulating a target system, comprising the steps of:

providing a reference signal;

generating a plurality of digital signals defining a reference pulse train with a frequency dependent upon said reference signal;

providing a target system to be regulated, said target system having an output in the form of a plurality of digital signals defining a feedback pulse train having a frequency;

comparing said frequency of said reference pulse train with said frequency of said feedback pulse train, and substantially aligning a leading edge of each digital signal in said reference pulse train with a leading edge of each digital signal in said feedback pulse train;

generating a control signal dependent upon said comparison without regard to phase locking said feedback pulse train to said reference signal, said generating step including the substeps of:

generating a proportional error pulse train including a plurality of digital signals, each said digital signal representing an error between a corresponding pair of aligned digital signals of said reference pulse train and said feedback pulse train;

generating an error direction pulse train including a plurality of digital signals, each said digital signal representing a directionality of said error between said corresponding pair of aligned digital signals;

counting up from zero with a first integral clock CI1 at a frequency fI1 when said digital signals of said proportional error pulse train are in a high state and said digital signals of said error direction pulse train are simultaneously in a high state;

counting down with said first integral clock CI1 at said frequency fI1 when said digital signals of said proportional error pulse train are in a high state and said digital signals of said error direction pulse train are in a low state;

maintaining said first integral clock CI1 at a current value when said digital signals of said proportional error pulse train are in a low state;

loading a current value of said first integral clock CI1 into a second integral clock CI2 each time said first integral clock CI1 transitions from a high state to a low state;

counting down from said loaded current value with said second integral clock CI2 at a frequency fI2 until a zero value is reached; and determining an integral error tern representing a time average of a signal which is held high while said second integral clock CI2 is in a high state and held low while said second integral clock CI2 is in a zero state, said control signal being dependent upon said integral error term; and providing said control signal as an input to said target system.

6. A method of regulating a target system, comprising the steps of:

providing a reference signal;

generating a plurality of digital signals defining a reference pulse train with a frequency dependent upon said reference signal;

providing a target system to be regulated, said target system having an output in the form of a plurality of digital signals defining a feedback pulse train having a frequency;

comparing said frequency of said reference pulse train wit said frequency of said feedback pulse train, and substantially aligning a leading edge of each digital signal in said reference pulse train with a leading edge of each digital signal in said feedback pulse train;

generating a control signal dependent upon said comparison without regard to phase locking said feedback pulse train to said reference signal, said generating step including the substeps of:

generating a proportional error pulse train including a plurality of digital signals, each said digital signal representing an error between a corresponding pair of aligned digital signals of said reference pulse train and said feedback pulse train;

counting up from zero with a first derivative clock CD1 at a frequency fD1 when said digital signals of said proportional error pulse train are in a high state;

subtracting a current state of said first derivative clock CD1 from a current state of a register R each time said first derivative clock CD1 transitions from a high state to a low state;

loading said subtracted state into a second derivative clock CD2;

loading said current state of said first derivative clock CD1 into said register R;

resetting said first derivative clock CD1 to zero;

counting down with said second derivative clock CD2 at a frequency fD2 after said subtracted state is loaded therein;

maintaining said first integral clock CI1 at a current value when said digital signals of said proportional error pulse train are in a low state; and determining a derivative error term representing a time average of a signal which is held high while said second derivative clock CD2 is in a high state and held low while said second derivative clock CD2 is in a zero state, said control signal being dependent upon said derivative error term; and providing said control signal as an input to said target system.

7. A method of regulating a target system, comprising the steps of:

provviding a reference signal;

generating a plurality of digital signals defining a reference pulse train with a frequency dependent upon said reference signal;

providing a target system to be regulated, said target system having an output in the form of a plurality of digital signals defining a feedback pulse train having frequency, said frequency of said feedback pulse train varying with time;

comparing said frequency of said reference pulse train with said frequency of said feedback pulse train;

generating a control signal dependent upon said comparison without regard to phase locking said feedback pulse train to said reference signal; and providing said control signal as an input to said target system.

* * * * *